(12) United States Patent
Zhang et al.

(10) Patent No.: US 9,188,061 B2
(45) Date of Patent: Nov. 17, 2015

(54) SYSTEM FOR TURBINE COMBUSTOR FUEL ASSEMBLY

(75) Inventors: Hua Zhang, Greer, SC (US); Douglas Frank Beadie, Greer, SC (US); Geoffrey David Myers, Simpsonville, SC (US); Fabien Thibault Codron, Simpsonville, SC (US); Gregory Allen Boardman, Greer, SC (US)

(73) Assignee: General Electric Company, Schenectady, NY (US)

(*) Notice: Subject to any disclaimer, the term of this patent is extended or adjusted under 35 U.S.C. 154(b) by 724 days.

(21) Appl. No.: 13/280,200

(22) Filed: Oct. 24, 2011

(65) Prior Publication Data

US 2013/0098040 A1    Apr. 25, 2013

(51) Int. Cl.
*F02G 3/00* (2006.01)
*F02C 3/30* (2006.01)

(52) U.S. Cl.
CPC ........................................ *F02C 3/305* (2013.01)

(58) Field of Classification Search
CPC ............ F02C 7/232; F02C 7/22; F02C 7/228; F23D 2209/30
USPC .......... 60/39.091, 39.094, 39.3, 39.53, 39.55, 60/734
See application file for complete search history.

(56) References Cited

U.S. PATENT DOCUMENTS

| | | | |
|---|---|---|---|
| 4,418,543 A | 12/1983 | Faucher et al. | |
| 4,798,330 A | 1/1989 | Mancini et al. | |
| 4,993,918 A | 2/1991 | Myers et al. | |
| 5,240,741 A | 8/1993 | Edwards, III et al. | |
| 5,298,091 A | 3/1994 | Edwards, III et al. | |
| 5,324,544 A | 6/1994 | Spence et al. | |
| 5,369,951 A * | 12/1994 | Corbett et al. | 60/39.3 |
| 5,448,890 A | 9/1995 | Coughlan, III et al. | |
| 5,809,771 A | 9/1998 | Wernberg | |
| 6,125,624 A | 10/2000 | Prociw | |
| 6,145,294 A | 11/2000 | Traver et al. | |
| 6,216,439 B1 * | 4/2001 | Nakamoto | 60/39.094 |
| 6,250,065 B1 | 6/2001 | Mandai et al. | |
| 6,256,975 B1 * | 7/2001 | Dobbeling et al. | 60/776 |
| 6,315,815 B1 | 11/2001 | Spadaccini et al. | |
| 6,397,602 B2 | 6/2002 | Vandervort et al. | |
| 6,427,447 B1 | 8/2002 | Sowa | |
| 6,438,938 B1 | 8/2002 | Burkholder et al. | |
| 6,457,316 B1 | 10/2002 | Czachor et al. | |
| 6,598,383 B1 | 7/2003 | Vandervort et al. | |
| 6,609,380 B2 * | 8/2003 | Mick et al. | 60/776 |
| 6,668,541 B2 | 12/2003 | Rice et al. | |
| 6,712,080 B1 | 3/2004 | Handschuh et al. | |
| 6,848,260 B2 | 2/2005 | North et al. | |
| 6,886,324 B1 | 5/2005 | Handshuh et al. | |
| 6,915,638 B2 | 7/2005 | Runkle et al. | |
| 6,918,255 B2 | 7/2005 | Kaplan et al. | |
| 6,931,853 B2 | 8/2005 | Dawson | |
| 6,935,116 B2 | 8/2005 | Stuttaford et al. | |

(Continued)

OTHER PUBLICATIONS

U.S. Appl. No. 13/280,216, filed Oct. 24, 2011, Hua Zhang.

(Continued)

*Primary Examiner* — Gerald L Sung
(74) *Attorney, Agent, or Firm* — Fletcher Yoder, P.C.

(57) ABSTRACT

A system includes a gas turbine engine having a combustor, a liquid fuel supply coupled to the combustor, and a water supply coupled to the liquid fuel supply. The water supply is configured to flow water through the liquid fuel supply while the liquid fuel supply is not in use to flow a liquid fuel.

20 Claims, 3 Drawing Sheets

(56) References Cited

U.S. PATENT DOCUMENTS

| | | |
|---|---|---|
| 6,986,254 B2 | 1/2006 | Stuttaford et al. |
| 7,007,476 B2 | 3/2006 | Mains et al. |
| 7,104,070 B2 | 9/2006 | Iasillo et al. |
| 7,117,675 B2 | 10/2006 | Kaplan et al. |
| 7,137,242 B2 | 11/2006 | Griffiths |
| 7,137,256 B1 | 11/2006 | Stuttaford et al. |
| 7,690,184 B2 | 4/2010 | Gauthier et al. |
| 7,950,238 B2 * | 5/2011 | Iasillo et al. .................. 60/772 |
| 7,954,310 B2 * | 6/2011 | Nest .......................... 60/39.094 |
| 2001/0004828 A1 * | 6/2001 | Nakamoto ................ 60/39.094 |
| 2007/0289308 A1 * | 12/2007 | Nest ................................ 60/772 |
| 2009/0165435 A1 | 7/2009 | Koranek |
| 2010/0058770 A1 | 3/2010 | Ryan |
| 2013/0091824 A1 * | 4/2013 | Murakami et al. ......... 60/39.094 |

OTHER PUBLICATIONS

U.S. Appl. No. 13/280,237, filed Oct. 24, 2011, Hua Zhang.
U.S. Appl. No. 13/280,265, filed Oct. 24, 2011, Hua Zhang.

* cited by examiner

SYSTEM FOR TURBINE COMBUSTOR FUEL ASSEMBLY

BACKGROUND OF THE INVENTION

The subject matter disclosed herein relates to combustion systems, and, more particularly, to supplying liquid fuel to gas turbine engines.

Various combustion systems include combustion chambers in which fuel and air combust to generate hot gases. For example, a gas turbine engine may include one or more combustion chambers that receive compressed air from a compressor, inject fuel into the compressed air, and generate hot combustion gases to drive the turbine engine. Each combustion chamber may be supplied with one or more different fuels, such as gaseous fuels and liquid fuels, that are used separately from one another. For example, the different fuels may be supplied to different combustion chambers through separate flow paths. Unfortunately, fuel left in an unused flow path may degrade and/or leaks may occur to cause backflow of hot combustion gases, thereby decreasing performance of the gas turbine engine.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas turbine engine having a combustor, a liquid fuel supply coupled to the combustor, and a water supply coupled to the liquid fuel supply. The water supply is configured to flow water through the liquid fuel supply while the liquid fuel supply is not in use to flow a liquid fuel.

In a second embodiment, a system includes a liquid fuel manifold configured to couple to a gas turbine combustor to route a liquid fuel to the gas turbine combustor, a water manifold configured to couple to the gas turbine combustor to route water to the gas turbine combustor, a liquid fuel supply valve configured to selectively supply the liquid fuel to the liquid fuel manifold, and a water supply valve configured to selectively supply water to the liquid fuel manifold to displace the liquid fuel from the liquid fuel manifold when the liquid fuel supply valve is closed.

In a third embodiment, a system includes a water controller configured to transmit a first signal to a water flow control to flow water from a water supply through a liquid fuel supply coupled to a combustor of a gas turbine engine while the liquid fuel supply is not in use to flow a liquid fuel.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
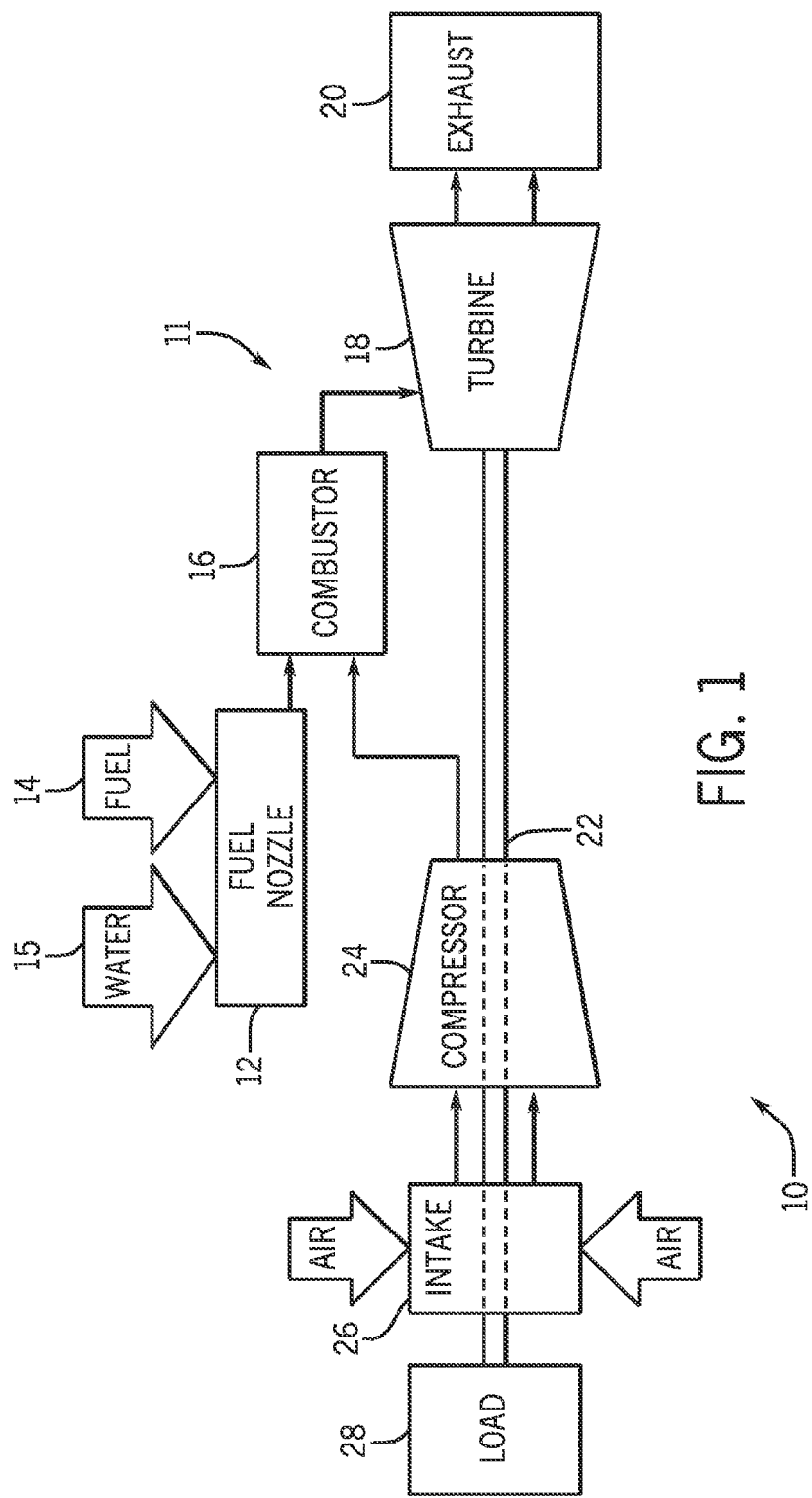
FIG. 1 is a block diagram of an embodiment of a turbine system having a combustor.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, certain embodiments provide systems for displacing a fuel from a fuel path into a combustor. For example, the combustor may be a gas turbine combustor disposed in a gas turbine engine. In certain embodiments, the gas turbine combustor may combust either a gaseous fuel, such as natural gas, or a liquid fuel, such as diesel fuel. The gaseous fuel may be supplied to the gas turbine combustor via a gaseous fuel path, while the liquid fuel may be supplied via a liquid fuel flow path separate from the gaseous flow path. The gas turbine combustor may primarily combust the gaseous fuel and combust the liquid fuel when the gaseous fuel is unavailable. Thus, even if a supply of gaseous fuel is interrupted, operation of the turbine combustor may continue. In some embodiments, when the gas turbine combustor is not combusting the liquid fuel, a controller may send signals to one or more control elements to displace the liquid fuel from the liquid fuel flow path with water supplied from a water flow path. In further embodiments, the controller may send signals to the one or more control elements to help maintain a pressure of the water in the liquid fuel flow path when the gas turbine combustor is not combusting the liquid fuel.

Displacement of the liquid fuel from the liquid fuel flow path with water when the liquid fuel is not being combusted may offer several advantages. For example, the water remaining in the liquid fuel flow path may help to prevent backflow of combustion gases from the gas turbine combustor into the liquid fuel supply. In other words, the water in the liquid fuel flow path may act as a buffer, or barrier, between the gas turbine combustor and the liquid fuel supply. Contact between the combustion gases and the water may be less likely to cause undesired reactions than contact between the combustion gases and the liquid fuel. Further, certain gas turbine engines may include a plurality of gas turbine combustors interconnected via a manifold of liquid fuel flow paths. The presence of water in the liquid fuel flow paths may help to prevent undesired backflow of combustion gases from one gas turbine combustor through to another through the manifold. Such backflow of combustion gases may cause damage to various components of the combustors, such as the nozzle tips. In addition, if any valves in the liquid fuel flow path leak, maintaining the water buffer at or above a certain pressure may cause the water to leak into the combustor instead of the combustion gases flowing back into the liquid fuel flow path. Such a small amount of water leaking into the combustor may have a minimal impact on combustor performance. However, a small amount of combustion gas backflow may cause damage to the nozzle tips. Further, water has a higher density than gases, for example, and thus may be more effective at clearing the liquid fuel from the liquid fuel flow path. Moreover, water may not contain oxygen, which may cause pyrolysis of the liquid fuel into varnish and solid carbon at high temperatures, such as between approximately 120 and 230 degrees Celsius. Such deposits of varnish and carbon may be carried downstream and cause poor spray quality, hot streaks, and damage to the gas turbine engine when it uses the liquid fuel again. In addition, the water may act as a heat sink, helping to cool components of the gas turbine engine not used when combusting gaseous fuel.

Turning now to the drawings and referring first to FIG. 1, a block diagram of an embodiment of a turbine system 10 having a gas turbine engine 11 is illustrated. The turbine system 10 may use liquid or gaseous fuel, such as natural gas and/or a synthetic gas, to drive the turbine system 10. As depicted, one or more fuel nozzles 12 intake a fuel supply 14. For example, one or more fuel nozzles 12 may be used to intake liquid fuel and one or more other fuel nozzles 12 may be used to intake gaseous fuel. In addition, the fuel nozzles 12 may intake a water supply 15 when the turbine system 10 uses liquid fuel. The water supply 15 may already be used elsewhere in the plant having the turbine system 10. For example, the water supply 15 may be used to generate steam in the plant. Thus, in certain embodiments, the turbine system 10 does not use a separate, dedicated water supply 15 for only the turbine system 10. As described in detail below, the disclosed turbine system 10 mixes the liquid fuel with the water supply 15 upstream from and/or within the fuel nozzles 12. Mixing the liquid fuel with the water supply 15 prior to injection may improve the efficiency of byproduct (e.g., $NO_x$, $SO_x$, CO, or particulate matter) suppression, thereby reducing production of the byproducts from the gas turbine engine 11. In other words, less water 15 may be used to reduce byproduct generation at a given operating condition (e.g., firing temperature) of the gas turbine engine 11. The fuel nozzles 12 then partially mix the fuel, or the fuel-water mixture, with air, and distribute the fuel, water (when used), and air mixture into the combustor 16 where further mixing occurs between the fuel, water (when used), and air. Although shown schematically as being outside or separate from the combustor 16, the fuel nozzles 12 may be disposed inside the combustor 16. The fuel, water (when used), and air mixture combusts in a chamber within the combustor 16, thereby creating hot pressurized exhaust gases. The combustor 16 directs the exhaust gases through a turbine 18 toward an exhaust outlet 20. Although only one combustor 16 is shown in FIG. 1, in certain embodiments, a plurality of combustors 16 may be arranged circumferentially about the gas turbine engine 11. Each of the plurality of combustors 16 may include separate fuel nozzles 12. As the exhaust gases pass through the turbine 18, the gases force turbine blades to rotate a shaft 22 along an axis of the turbine system 10. As illustrated, the shaft 22 is connected to various components of the turbine system 10, including a compressor 24. The compressor 24 also includes blades coupled to the shaft 22. As the shaft 22 rotates, the blades within the compressor 24 also rotate, thereby compressing air from an air intake 26 through the compressor 24 and into the fuel nozzles 12 and/or combustor 16. The shaft 22 may also be connected to a load 28, which may be a vehicle or a stationary load, such as an electrical generator in a power plant or a propeller on an aircraft, for example. The load 28 may include any suitable device capable of being powered by the rotational output of turbine system 10.

Figure 2:
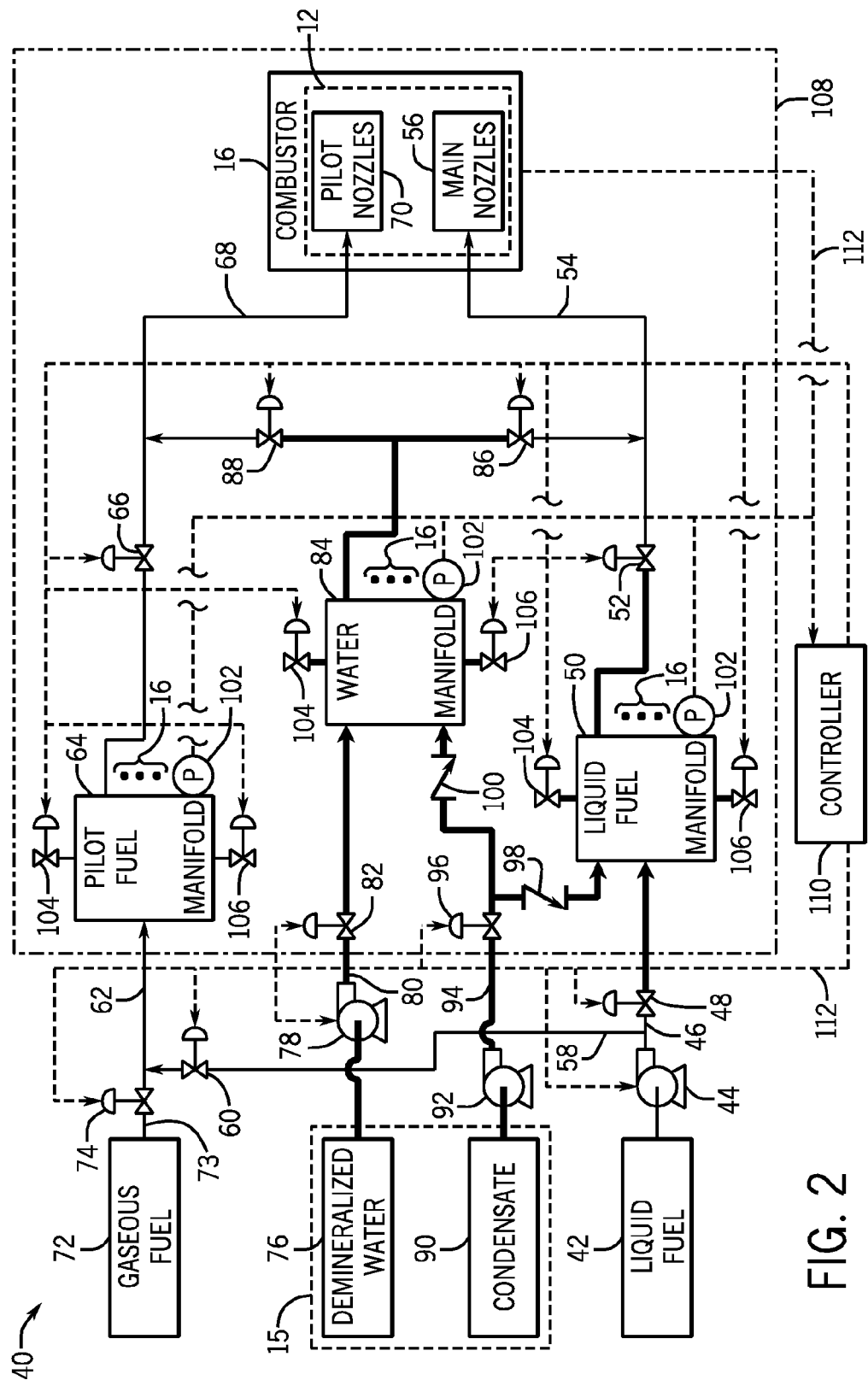
FIG. 2 is a block diagram of an embodiment of a fuel supply system for a turbine combustor.

FIG. 2 illustrates a block diagram of a turbine fuel supply system 40 of the combustor 16 of the gas turbine engine 11, as illustrated in FIG. 1. In the following discussion, the term "valve" is used to refer to any device capable of operating as a flow control. As illustrated, a liquid fuel 42 may be supplied to the combustor 16. Examples of the liquid fuel 42 include, but are not limited to, hydrocarbon based liquid fuels, such as diesel fuel, jet fuel, gasoline, naphtha, fuel oil, and so forth. The liquid fuel 42 is transferred to the combustor 16 using a liquid fuel pump 44 along a liquid fuel flow path 46, which may include a liquid fuel supply valve 48. The liquid fuel flow path 46 may also include a liquid fuel manifold 50, which may be used to supply the liquid fuel 42 to a plurality of combustors 16 (as indicated by vertical dots), which may be, for example, arranged circumferentially about the liquid fuel manifold 50. In other words, each of the plurality of combustors 16 may be connected to the liquid fuel manifold 50 via a plurality of flow paths. In certain embodiments, the liquid fuel manifold 50 may be configured as a ring with a circular or polygonal shape. The liquid fuel supply valve 48 may be used to adjust and/or isolate flow of the liquid fuel 42 to the liquid fuel manifold 50. In certain embodiments, a liquid fuel mixing valve 52 may be disposed in the liquid fuel flow path 46 downstream of the liquid fuel manifold 50. The liquid fuel mixing valve 52 may be used to adjust a flow rate of the liquid fuel 42 that is mixed with the water supply 15 to form a mixture 54 of the liquid fuel and water. For example, the liquid fuel mixing valve 52 may be an on/off valve or a throttling valve. The mixture 54 of the liquid fuel and water is then routed to main nozzles 56 of the combustor 16. The main nozzles 56 may constitute a portion of the fuel nozzles 12 and may discharge the mixture 54 of the liquid fuel 42 and water 15 at high, or normal, flow rates. The water supply 15 may be used to displace the liquid fuel 42 from the liquid fuel flow path 46 when the gas turbine engine 11 is combusting gaseous fuel instead of the liquid fuel 42, as described in detail below.

In certain embodiments, a portion of the liquid fuel 42 may be routed to a pilot fuel flow path 58, which may include a pilot fuel supply valve 60. The pilot fuel flow path 58 may be used to start the combustor 16 with the liquid fuel 42 prior to placing the liquid fuel flow path 46 and main nozzles 56 in service. The pilot fuel flow path 58 may continue to be used after the main nozzles 56 are placed in service. The pilot fuel flow path 58 may be used to start the combustor 16 because the pilot fuel flow path 58 may flow a lower flow rate of the liquid fuel 42 than the liquid fuel flow path 46. In certain embodiments, the flow rate of the liquid fuel 42 through the pilot fuel flow path 58 may be between approximately 5 to 50, 10 to 35, or 15 to 25 percent of a normal, or regular, flow rate. Thus, a low flow rate of the liquid fuel 42, which may be referred to as pilot fuel, may be used to first start the combustor 16. Afterwards, the liquid fuel flow path 46 and the pilot fuel flow path 58 may be used together to supply the normal, or regular, flow rate of the liquid fuel 42 to the combustor 16. During startup of the combustor 16, the liquid fuel 42 from the pilot fuel supply valve 60 may be routed to a pilot fuel manifold 64, which may be used to supply the pilot fuel to the plurality of combustors 16 (as indicated by vertical dots). In other words, each of the plurality of combustors 16 may be connected to the pilot fuel manifold 64 via a plurality of flow paths. In certain embodiments, the pilot fuel manifold 64 may be configured as a ring with a circular or polygonal shape. The pilot fuel supply valve 60 may be used to adjust and/or isolate flow of the liquid fuel 42 to the pilot fuel manifold 64. A pilot fuel mixing valve 66 may be disposed in the pilot fuel flow path 58 downstream of the pilot fuel manifold 64. The pilot fuel mixing valve 66 may be used to adjust a flow rate of the liquid fuel 42 that is mixed with the water supply 15 to form a mixture 68 of the pilot fuel and water. For example, the pilot fuel mixing valve 66 may be an on/off valve or a throttling valve. The mixture 68 of the pilot fuel and water is then routed to pilot nozzles 70 of the combustor 16. The pilot nozzles 70 may constitute another portion of the fuel nozzles 12 and may discharge the pilot fuel-water mixture 68 at low, or startup, flow rates. For example, the pilot nozzles 70 may be used during startup of the combustor 16, after which the main nozzles 56 are used to inject the mixture 54 at normal flow rates. Accordingly, the pilot nozzles 70 may be smaller than the main nozzles 56. The smaller size of the pilot nozzles 70 provides a fine spray of the mixture 68 at the startup flow rates, or at part-speed or low part-load rates. Thus, the pilot nozzles 70 may be limited to passing lower flow rates compared to the main nozzles 56. For example, the flow rate of the pilot fuel-water mixture 68 through the pilot nozzles 70 may be between approximately 5 to 50, 10 to 35, or 15 to 25 percent of a flow rate through the main nozzles 56. In some embodiments, the pilot nozzles 70 may be used together with, or at the same time as, the main nozzles 56. For example, the pilot nozzles 70 may continue to be used together with the main nozzles 56 because the pilot nozzles 70 may be cooled by the flow of the pilot fuel-water mixture 68 through the pilot nozzles 70. When the combustor 16 swaps to combusting the gaseous fuel 72, the main nozzles may be purged and turned off, followed by purging the pilot nozzles 70 with the gaseous fuel 72. In addition, the combustor 16 may include additional fuel nozzles 12 to supply the gaseous fuel 72 when not combusting the liquid fuel 42 injected through the main nozzles 56 and the pilot nozzles 70.

When the combustor 16 is combusting the gaseous fuel 72, the pilot fuel flow path 58 may no longer be used to supply the liquid fuel 42 to the combustor 16. Instead, the water supply 15 may be used to displace, or purge, the liquid fuel 42 in the pilot fuel flow path 58 into the combustor 16. A gaseous fuel 72 may then be supplied to the pilot fuel manifold 64 via a gaseous fuel flow path 73, thereby purging the water and any remaining liquid fuel 42 from the pilot fuel manifold 64 with the gaseous fuel 72. Examples of the gaseous fuel 72 include, but are not limited to, methane, natural gas, syngas, and so forth. The gaseous fuel flow path 73 may include a gaseous fuel supply valve 74, which may be used to adjust and/or isolate flow of the gaseous fuel 72. Purging the pilot fuel flow path 58 with the water supply 15 and the gaseous fuel 72 may help prevent the liquid fuel 42 from coking or oxidizing in the pilot fuel flow path 58 when not in use. In other embodiments, other gases, such as nitrogen, carbon dioxide, steam, and so forth, may be used to purge the water and the liquid fuel 42 from the pilot fuel flow path 58 when not in use. In addition, the gaseous fuel 72 may continue to purge the pilot nozzles 70 as the combustor 16 combusts the gaseous fuel 72. The small size of the pilot nozzles 70 may cause the pilot nozzles 70 to be more susceptible to clogging and thus, more difficult to flush. Thus, a continuous purge using the gaseous fuel 72 may help to prevent clogging of the pilot nozzles 70 when not in use injecting the pilot fuel-water mixture 68. In addition, the pilot nozzles 70 may be more exposed to hot recirculating combustion gases because of their location in the combustor 16 and may not be protected by compressor discharge air like the main nozzles 56. Thus, the continuous purge of gaseous fuel 72 may also help to cool and protect the pilot nozzles 70. The main nozzles 56 could also be protected by a purge of gaseous fuel 72, but there may be less reason to do so and the flow rate of the gaseous fuel 72 may be much greater.

Several sources of water may be used in the turbine fuel supply system 40 to be mixed with the liquid fuel 42 to be combusted in the combustor 16 or to displace, or clean, the liquid fuel 42 from the liquid fuel flow path 46 and/or pilot fuel flow path 58. In other words, any of the following sources of water may be injected into the combustor 16 together with the liquid fuel 42 or used to purge the liquid fuel 42 from the liquid fuel flow path 46 and/or the pilot fuel flow path 58. One source of water may be demineralized water 76, which may be defined as water from which most or all minerals have been removed. Demineralized water 76 may also be deoxygenated, thereby helping to prevent coking or carbon formation in hot, liquid fuel-wetted surfaces. Examples of methods that may be used to produce the demineralized water 76 include, but are not limited to, distillation, reverse osmosis, nanofiltration, and so forth. The lack of minerals in the demineralized water 76 may reduce corrosion in the turbine fuel supply system 40. Specifically, minerals present in water that is not demineralized may form salts and acids that when mixed with combustion products in the combustor 16 may cause corrosion of alloys of the downstream gas turbine engine 11. The demineralized water 76 may not be used only for the turbine fuel supply system 40. In fact, the demineralized water 76 may already be used elsewhere, for example in a steam turbine or heat recovery steam generator. The amount of demineralized water 76 used in a steam turbine may be many times greater than that used for the turbine fuel supply system 40. Thus, use of demineralized water 76 already used elsewhere may avoid the cost, complexity, and reliability issues associated with a dedicated system for the turbine fuel supply system 40. Returning to FIG. 2, the demineralized water 76 is transferred to the combustor 16 using a demineralized water pump 78 along a demineralized water flow path 80, which may include a demineralized water supply valve 82. The demineralized water flow path 80 may also include a demineralized water manifold 84, which may be used to supply the demineralized water 76 to the plurality of combustors 16 (as indicated by vertical dots), which may be, for example, arranged circumferentially about the demineralized water manifold 84. In other words, each of the plurality of combustors 16 may be connected to the demineralized water manifold 84 via a plurality of flow paths. In certain embodiments, the demineralized water manifold 84 may be configured as a ring with a circular or polygonal shape. The demineralized water supply valve 82 may be used to adjust and/or isolate flow of the demineralized water 76 to the demineralized water manifold 84. In certain embodiments, a demineralized water liquid fuel mixing valve 86 and a demineralized water pilot fuel mixing valve 88 may be disposed in the demineralized water flow path 80 downstream of the demineralized water manifold 84. The demineralized water liquid fuel mixing valve 86 and the demineralized water pilot fuel mixing valve 88 may adjust a flow of the demineralized water 76 to the liquid fuel flow path 46 and the pilot fuel flow path 58, respectively. For example, the demineralized water liquid fuel mixing valve 86 and the demineralized water pilot fuel mixing valve 88 may be on/off valves or throttling valves. Thus, the valves 86 and 88 may be used to adjust a composition of the liquid fuel 42 and demineralized water 76 combusted in the combustor 16. The demineralized water 76 may also be used to displace the liquid fuel from the paths 46 and/or 58 when not used to supply the liquid fuel 42 to the combustor 16. In addition, demineralized water 76 may be a better solvent for cleaning the various components of the turbine fuel supply system 40 than water that is not demineralized, for example. In certain embodiments, the liquid fuel mixing valve 52, pilot fuel mixing valve 66, the demineralized water liquid fuel mixing valve 86, and the demineralized water pilot fuel mixing valve 88 may be disposed in a close coupled valve assembly, or manifold, to help minimize lengths of the various flow paths between the liquid fuel manifold 50, pilot fuel manifold 64, demineralized water manifold 84, and the plurality of combustors 16.

Another source of water for the turbine fuel supply system 40 is condensate 90, which may be defined as the liquid phase produced by the condensation of steam. The condensate 90 may be readily available in plants that include the turbine system 10 and may include very small quantities of minerals. Condensate 90 may also be deoxygenated. In addition, the condensate 90 may be warmer than the demineralized water 76. For example, a temperature of the condensate 90 may be between approximately 100 to 370, 150 to 300, or 200 to 250 degrees Celsius. The condensate 90 may clean flow paths containing the liquid fuel 42 better than cool water, because the liquid fuel 42 may be more soluble in the condensate 90 and/or more volatile at the higher temperatures of the condensate 90. The condensate 90 may be available at pressures above approximately 6,800 kPa, thereby enabling the condensate 90 to mix with the liquid fuel 42. Returning to FIG. 2, the condensate 90 is transferred to the combustor 16 using a condensate pump 92 along a condensate flow path 94, which may include a condensate supply valve 96. In certain embodiments, the condensate 90 may flow directly to the liquid fuel manifold 50 through a check valve 98 to displace and clean the liquid fuel 42 from the liquid fuel manifold 50, liquid fuel flow path 46, and/or pilot fuel flow path 58. The check valve 98 may help to prevent backflow of the liquid fuel 42 into the condensate 90. In other embodiments, the condensate 90 may flow to the water manifold 84 through a check valve 100 to be mixed with the liquid fuel 42 in the liquid fuel flow path 46 and/or the pilot fuel flow path 58 to be combusted in the combustor 16. The check valve 98 may help to prevent backflow of material in the water manifold 84 into the condensate 90. In further embodiments, other sources of water, or cleaning agents, may be used instead of the demineralized water 76 or the condensate 90.

In the illustrated embodiment, the liquid fuel manifold 50, the pilot fuel manifold 64, and the water manifold 84 may each include a pressure sensor 102, which may provide an indication of the pressure in the manifolds 50, 64, and 84. In addition, the manifolds 50, 64, and 84 may each include a vent valve 104 and a drain valve 106. The vent valves 104 may be used to vent, or remove, any gases from the manifolds 50, 64, and 84. Thus, the vent valves 104 enable the manifolds 50, 64, and 84 to be essentially free of gases, or completely full of liquid (e.g., liquid-full). Similarly, the drain valves 106 may be used to drain, or remove, liquids from the manifolds 50, 64, and 84.

As shown in FIG. 2, various components of the turbine fuel supply system 40 are included in a gas turbine enclosure 108, or high temperature portion, of the gas turbine engine 11. The gas turbine enclosure 108 may include portions of the gas turbine engine 11 exposed to high temperatures caused by the combustion within the gas turbine engine 11. Thus, equipment and components disposed in the gas turbine enclosure 108 may be specially designed for high temperature service. In addition, any stagnant liquid fuel 42 in the gas turbine enclosure 108 may be subject to accelerated degradation and/or oxidation. Specifically, any liquid fuel 42 left stagnant in the gas turbine enclosure 108 may oxidize to form carbon deposits and varnishes that are difficult to remove. Thus, embodiments of the turbine fuel supply system 40 may be configured to displace stagnant liquid fuel 42 in the gas turbine enclosure 108 with essentially mineral-free sources of water 15, such as demineralized water 76 or condensate 90. Specifically, the water may remain in lines of the gas turbine enclosure 108 indicated in bold in FIG. 2 to act as a buffer from the hot combustion gases generated in the combustor 16. Such mineral-free water 15 may also be less likely to cause corrosion in the gas turbine engine 11. When the liquid fuel 42 is used again by the combustor 16, the water 15 may be displaced into the combustor 16 by the liquid fuel 42 to form water vapor that helps to cool the flame in the combustor 16. Since the water vapor generated by the displaced water 15 is a small amount, it may have a negligible effect on the combustor 16.

In certain embodiments, the turbine fuel supply system 40 may include a controller 110, which may send and/or receive various signals along signal paths 112. In the following discussion, the signals sent or received along the signal path 112 will also be referred to by the reference numeral 112. For example, the controller 110 may send signals 112 to one or more of the liquid fuel supply valve 48, the liquid fuel mixing valve 52, the pilot fuel supply valve 60, the pilot fuel mixing valve 66, the gaseous fuel supply valve 74, the demineralized water supply valve 82, the liquid fuel demineralized water mixing valve 86, the pilot fuel demineralized water mixing valve 88, the condensate supply valve 96, the vent valves 104, and the drain valves 106 to cause the valves to open or close. In addition, the controller 110 may receive signals 112 from the pressure sensors 102. In further embodiments, the controller 110 may receive one or more signals 112 indicative of various parameters of the combustor 16. In certain embodiments, the controller 110 may send signals 112 to adjust a pressure of the water 15 in one or more of the manifolds 50, 64, or 84 if a sensed level of the water pressure indicated by the pressure sensor 102 is below a threshold level of the water pressure. The threshold level may be established above a pressure of the working fluid (e.g., air) in the gas turbine engine 11 to help prevent backflow of hot combustion gases into the turbine fuel supply system 40. For example, the threshold level may be greater than the discharge air pressure of the gas turbine engine 11. In certain embodiments, the threshold level may be between approximately 1700 to 3500, 2000 to 3000, or 2400 to 2800 kilopascals. For example, if the pressure sensor 102 senses a water pressure in one or more of the manifolds 50, 64, or 84 below the threshold level of the water pressure, the controller 110 may send a signal 112 to cause the demineralized water supply valve 82 and/or the condensate supply valve 96 to open further to enable additional water 15 to flow to one or more of the manifolds 50, 64, or 84. For example, the demineralized water liquid fuel mixing valve 86 and/or the demineralized water pilot fuel mixing valve 88 may leak, causing some demineralized water 76 to enter the combustor 16. The pressure in the water manifold 84 may fall below the threshold level of the water pressure, causing the controller 110 to send a signal 112 to the demineralized water supply valve 82 to flow additional demineralized water 76 into the water manifold 84 until the pressure reached the threshold level. Similarly, if the pressure sensor 102 senses a water pressure in one or more of the manifolds 50, 64, or 84 above the threshold level of the water pressure, the controller 110 may send a signal 112 to cause one or more of the drain valves 106 to open partially to reduce the pressure of the water 15 in one or more of the manifolds 50, 64, or 84. Additionally, the controller 110 may send a signal 112 to cause the demineralized water pump 78 and/or the condensate pump 92 to shut off to help reduce the water pressure in the manifolds 50, 64, and/or 84. In further embodiments, the controller 110 may send a signal 112 to cause the demineralized water supply valve 82 and/or the condensate supply valve 96 to open further if a ratio of the sensed level of the water pressure to a combustion pressure of the combustor 16 is less than a threshold. In certain embodiments, the threshold ratio may be between approximately 1.03 to 4, 1.1 to 3, or 1.2 to 2.5. Maintaining the water pressure above the combustion pressure of the combustor 16 may help to prevent backflow of the hot combustion gases. Backflow of hot combustion gases may cause damage to the tips of the nozzles 12.

Figure 3:
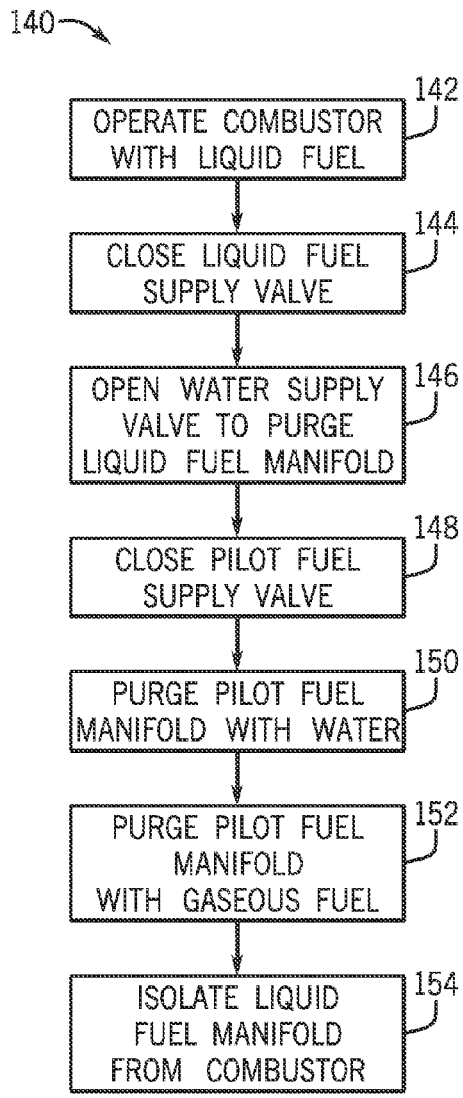
FIG. 3 is a flow chart of a process for cleaning a liquid fuel flow path with water.

FIG. 3 illustrates a process 140 that may be used to remove, or clean, the liquid fuel 42 from the turbine fuel supply system 40. The process 140 may be a computer-implemented process, such as code disposed on a nontransitory tangible computer readable medium. In a first step 142, the combustor 16 operates using the liquid fuel 42 supplied along the liquid fuel flow path 46. Both the main nozzles 56 and the pilot nozzles 70 may be used. When the combustor 16 no longer uses the liquid fuel 42, in a second step 144, the controller 110 sends a signal 112 to cause the liquid fuel supply valve 48 to close, thereby stopping the flow of the liquid fuel 42 to the combustor 16 through the main nozzles 56. Next, in a third step 146, the demineralized water supply valve 82 or the condensate supply valve 96 is opened to displace, or purge, the liquid fuel 42 from the liquid fuel manifold 46 and associated paths. Specifically, the demineralized water 76 may flow through the demineralized water flow path 80, water manifold 84, demineralized water liquid fuel mixing valve 86, liquid fuel mixing valve 52, liquid fuel manifold 50, and out through the drain valve 106. Alternatively, the demineralized water 76 may flow through the demineralized water flow path 80, water manifold 84, demineralized water liquid fuel mixing valve 86, and into the combustor 16. Similarly, the condensate 90 may flow through the condensate flow path 94, condensate supply valve 96, check valve 98, liquid fuel manifold 50, and out through the drain valve 106. Alternatively, the condensate 90 may flow through the condensate flow path 94, condensate supply valve 96, check valve 98, liquid fuel manifold 50, liquid fuel mixing valve 52, and into the combustor 16. In a fourth step 148, the controller 110 sends a signal 112 to cause the pilot fuel supply valve 60 to close. Up until the fourth step 148, the liquid fuel 42 has been flowing to the pilot nozzles 70. In a fifth step 150, the pilot fuel manifold 64 is purged with either demineralized water 76 or condensate 90 in a similar manner as the purging of the liquid fuel manifold 50. In a sixth step 152, the pilot fuel manifold 64 is purged with the gaseous fuel 72, thus displacing the demineralized water 76 or condensate 90. In other words, the controller 110 may send a signal 112 to cause the gaseous fuel supply valve 74 to open, thereby enabling the gaseous fuel 72 to flow through the pilot fuel manifold 64 to the combustor 16. As the pilot nozzles 70 may be smaller than the main nozzles 56, purging the pilot nozzles 70 with the gaseous fuel 72 when not being used to inject the liquid fuel 42 may help prevent the pilot nozzles 70 from being clogged, help to cool the pilot nozzles 70, and help block hot, recirculating combustion products (e.g., air, carbon dioxide, and water vapor). In other embodiments, other gases, such as nitrogen, carbon dioxide, steam, and so forth, may be used instead of the gaseous fuel 72. If the combustor 16 is swapping to combusting gaseous fuel 72, the gaseous fuel 72 continues to purge the pilot nozzles 70 after the sixth step 152 to help protect the pilot nozzles 70. In a seventh step 154, the liquid fuel manifold 46 is isolated from the combustor 16 by closing liquid fuel mixing valve 52. The demineralized water 76 or condensate 90 may remain in the portion of the liquid fuel flow path 46 and liquid fuel manifold 50 upstream of the liquid fuel mixing valve 52 (shown in bold in FIG. 2), thereby acting as a buffer, or barrier, between the liquid fuel 42 and the combustor 16. Thus, leakage through the liquid fuel mixing valve 52 may cause a portion of the demineralized water 76 to enter the combustor 16, which may be more desirable than backflow of hot combustion gases from the combustor 16. When the combustor 16 uses the liquid fuel 42 again, the controller 110 may send a signal 112 to cause the liquid fuel supply valve 48 to open, thereby displacing the demineralized water 76 or condensate 90 into the combustor 16 with the liquid fuel 42. The demineralized water 76 or condensate 90 may vaporize to form a small amount of steam in the combustor 16. Although specific flow paths are mentioned above, the water supply 15 may flow through any of the illustrated lines, flow paths, valves, manifolds, and so forth illustrated in FIG. 2 for purging, cleaning, and displacing the liquid fuel 42.

Figure 4:
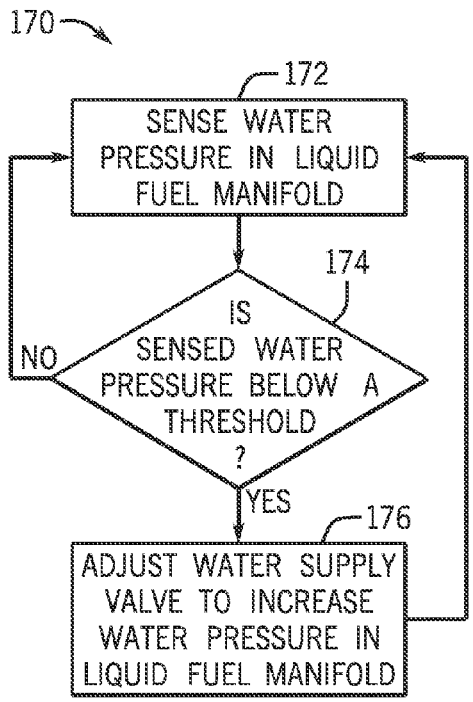
FIG. 4 is a flow chart of a process for maintaining a water pressure in a liquid fuel flow path.

FIG. 4 illustrates a process 170 that may be used to maintain a water pressure in the liquid fuel flow path 46 of the turbine fuel supply system 40. The process 170 may be a computer-implemented process, such as code disposed on a nontransitory tangible computer readable medium. The process 170 may be used after the liquid fuel flow path 46 has been cleaned using the process 140 described above. In a first step 172 of the process 170, the pressure sensor 102 disposed on the liquid fuel manifold 50 senses a water pressure in the liquid fuel manifold 50. In a second step 174, the controller 110 determines whether the sensed water pressure by the pressure sensor 102 is below a threshold. The threshold may be established to help prevent backflow of hot combustion products from the combustor 16 into the liquid fuel manifold 50. If the sensed water pressure is not below the threshold, the process 170 returns to the first step 172 to sense the water pressure in the liquid fuel manifold 50. If the sensed water pressure is below the threshold, in a third step 176, the controller 110 sends a signal 112 to cause the demineralized water supply valve 82 or the condensate supply valve 96 to open more, thereby increasing the water pressure in the liquid fuel manifold 50. In addition, the controller 110 may send a signal 112 to cause the demineralized water pump 78 or the condensate pump 92 to either turn on or to increase the pressure of the demineralized water 76 or the condensate 90. If the water pressure in the liquid fuel manifold 50 remains below the threshold, the controller 110 may send a message or alarm to an operator to investigate further.

As discussed above, the high temperatures associated with the gas turbine enclosure 108 of the gas turbine engine 11 may cause any stagnant liquid fuel 42 to degrade or oxidize. When the degraded liquid fuel 42 is supplied to the combustors 16 of the gas turbine engine 11, the performance and/or efficiency of the gas turbine engine 11 may be reduced. The water supply 15 may be used to mix water together with the liquid fuel 42 to be combusted in the gas turbine engine 11. The water supply 15 may already be produced for other plant equipment, such as steam turbines. Such mixtures of water and the liquid fuel 42 may reduce the production of undesired by-products. When the gas turbine engine 11 is not combusting the liquid fuel 42 (e.g., combusting the gaseous fuel 72), the water supply 15 may also be used to purge the liquid fuel 42 from any flow paths disposed in the gas turbine enclosure 108 to prevent the formation of degraded liquid fuel 42. The water may remain in the flow paths of the gas turbine enclosure 108 to act as a buffer to help prevent backflow of hot combustion products from the combustor 16. Thus, certain embodiments may include the controller 110 to monitor the pressure of the water in the flow paths and maintain the integrity of the water buffer by adding additional water when necessary. Thus, the flow paths may be ready to receive the liquid fuel 42 when the gas turbine engine 11 begins combusting the liquid fuel 42 again.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a gas turbine engine having a combustor;
   a liquid fuel supply coupled to the combustor, wherein the liquid fuel supply is configured to supply a liquid fuel to the combustor;
   a water supply coupled to the liquid fuel supply, wherein the water supply is configured to flow water through the liquid fuel supply to displace the liquid fuel and to maintain a pressure of the water in the liquid fuel supply after the liquid fuel is displaced while the liquid fuel supply is not in use to flow a liquid fuel; and
   a mixing valve disposed in the liquid fuel supply upstream of the combustor, wherein the mixing valve is configured to substantially block flow of the water from entering the combustor.

2. The system of claim 1, wherein the water supply comprises a water manifold configured to couple to a plurality of combustors, and the liquid fuel supply comprises a liquid fuel manifold configured to couple to the plurality of combustors.

3. The system of claim 1, wherein the water supply comprises a check valve configured to block backflow of the liquid fuel into the water supply.

4. The system of claim 1, wherein the water supply comprises a water vent valve configured to vent a first gas from the water supply, and the liquid fuel supply comprises a liquid vent valve configured to vent a second gas from the liquid fuel supply.

5. The system of claim 1, comprising a controller configured to cause a flow of the liquid fuel to be blocked and to cause flow of the water through the liquid fuel supply to displace the liquid fuel.

6. The system of claim 5, wherein the controller is configured to monitor a water pressure of the liquid fuel supply and to cause an increase of water pressure if a sensed water pressure in the liquid fuel supply is below a threshold level.

7. A system, comprising:
   a liquid fuel manifold configured to couple to a gas turbine combustor to route a liquid fuel to the gas turbine combustor via a liquid fuel supply line;
   a water manifold configured to couple to the gas turbine combustor to route water to the gas turbine combustor via a water supply line coupled to the liquid fuel supply line;
   a liquid fuel supply valve configured to selectively supply the liquid fuel to the liquid fuel manifold;
   a water supply valve configured to selectively supply water to the liquid fuel manifold via the water manifold to displace the liquid fuel from the liquid fuel manifold and to maintain a first pressure of the water in the liquid fuel manifold after the liquid fuel is displaced when the liquid fuel supply valve is closed; and
   a mixing valve disposed in the liquid fuel supply line, wherein the mixing valve is configured to substantially block flow of the water from entering the gas turbine combustor.

8. The system of claim 7, comprising:
   a pilot fuel manifold configured to couple to the gas turbine combustor to route a pilot fuel to the gas turbine combustor via a pilot fuel supply line; wherein the water supply line is coupled to the pilot fuel supply line; and
   a pilot fuel supply valve configured to supply the pilot fuel to the pilot fuel manifold, wherein the water supply valve is configured to selectively supply water to the pilot fuel manifold via the water manifold to displace the pilot fuel from the pilot fuel manifold and to maintain a second pressure of the water in the pilot fuel manifold after the pilot fuel is displaced when the pilot fuel supply valve is closed.

9. The system of claim 7, comprising a water controller configured to transmit a first signal to cause the liquid fuel supply valve to close, a second signal to cause the water supply valve to open to displace the liquid fuel from the liquid fuel manifold with water, and a third signal to adjust the water supply valve to increase a water pressure in the liquid fuel manifold if a sensed water pressure in the liquid fuel manifold is below a threshold level.

10. The system of claim 7, comprising a water pressure sensor disposed in the liquid fuel manifold and configured to transmit an input signal indicative of a sensed water pressure in the liquid fuel manifold to the water controller.

11. The system of claim 7, comprising a check valve coupled to the water manifold and configured to block backflow of the liquid fuel into a supply of water to the water manifold.

12. The system of claim 7, wherein the water manifold comprises a water vent valve configured to vent a first gas from the water manifold, and the liquid fuel manifold comprises a liquid vent valve configured to vent a second gas from the liquid fuel manifold.

13. The system of claim 7, comprising the gas turbine combustor.

14. The system of claim 7, wherein the water comprises demineralized water, steam condensate, or a combination thereof.

15. A system, comprising:
   a water controller configured to transmit a first signal to a water flow control to flow water from a water supply through a liquid fuel supply coupled to a combustor of a gas turbine engine to displace a liquid fuel and to maintain a pressure of the water in the liquid fuel supply after the liquid fuel is displaced while the liquid fuel supply is not in use to flow a liquid fuel, and a fourth signal to a mixing valve disposed in the liquid fuel supply upstream of the combustor to substantially block flow of the water from entering the combustor.

16. The system of claim 15, wherein the water controller is configured to transmit a second signal to a liquid fuel flow control to block a flow of a liquid fuel through the liquid fuel supply prior to transmitting the first signal.

17. The system of claim 15, wherein the water controller is configured to transmit a third signal to cause the water flow control to increase a water pressure in the liquid fuel supply if a sensed level of the water pressure in the liquid fuel supply is below a threshold level.

18. The system of claim 17, comprising a water pressure sensor disposed in the liquid fuel supply and configured to transmit an input signal indicative of the sensed water pressure in the liquid fuel supply to the water controller.

19. The system of claim 17, wherein the threshold level of the water pressure is greater than approximately 1700 kilopascals.

20. The system of claim 17, wherein the water pressure controller is configured to transmit the third signal to the water flow control if a ratio of the sensed level of the water pressure to a combustion pressure of the combustor is less than approximately 1.03.

\* \* \* \* \*